(12) United States Patent
Thompson

(10) Patent No.: US 7,540,074 B2
(45) Date of Patent: Jun. 2, 2009

(54) CARABINER HAVING REINFORCING SLEEVE

(75) Inventor: Rocke P. Thompson, Bountiful, UT (US)

(73) Assignee: Techxotic, L.C., Clearfield, UT (US)

( * ) Notice: Subject to any disclaimer, the term of this patent is extended or adjusted under 35 U.S.C. 154(b) by 24 days.

(21) Appl. No.: 11/291,493

(22) Filed: Dec. 1, 2005

(65) Prior Publication Data

US 2006/0137151 A1    Jun. 29, 2006

Related U.S. Application Data

(60) Provisional application No. 60/638,887, filed on Dec. 21, 2004.

(51) Int. Cl.
*F16B 45/02* (2006.01)
*F16B 45/00* (2006.01)

(52) U.S. Cl. .................... 24/600.2; 24/601.1; 24/599.9; 24/599.5

(58) Field of Classification Search ................ 24/599.9, 24/599.5, 600.2, 601.1, 582.11
See application file for complete search history.

(56) References Cited

U.S. PATENT DOCUMENTS

| | | | |
|---|---|---|---|
| 1,886,726 A * | 11/1932 | Pennefather | 24/600.4 |
| 4,930,194 A * | 6/1990 | Frechin | 24/588.1 |
| 5,329,675 A | 7/1994 | McLean et al. | |
| 5,357,657 A | 10/1994 | Petzl | |
| 5,416,955 A | 5/1995 | Katsma | |
| 5,463,798 A | 11/1995 | Wurzer | |
| 5,577,304 A | 11/1996 | Simond | |
| 5,608,953 A | 3/1997 | Petzl et al. | |
| 5,791,025 A | 8/1998 | Maurice et al. | |
| 6,588,076 B1 | 7/2003 | Choate | |
| 6,622,354 B1 | 9/2003 | Klingier | |
| 2002/0050032 A1 | 5/2002 | Carnall | |
| 2002/0073520 A1 | 6/2002 | Hall | |
| 2003/0106190 A1 | 6/2003 | Christianson | |
| 2003/0167608 A1 | 9/2003 | Petzl et al. | |
| 2004/0143945 A1 | 7/2004 | Christianson | |
| 2005/0246875 A1 | 11/2005 | Brown | |

FOREIGN PATENT DOCUMENTS

EP    0 376 860 B1    12/1989

* cited by examiner

*Primary Examiner*—Robert J Sandy
(74) *Attorney, Agent, or Firm*—Traskbritt

(57) ABSTRACT

Various embodiments for locking carabiners employing a reinforcing sleeve are described. The carabiners of the present invention include a C-shaped body having a nose region and an end region. A gate including a flanged region housing a receptacle configured to receive the nose region in a receptacle is pivotally mounted at the end region. A sleeve is movably mounted on the gate, allowing the nose region to be secured within the receptacle. The sleeve is closely fitted about the gate at the flanged region, providing support for the flanged region of the gate in a plurality of lateral directions while securing the nose region within the receptacle. The nose of the carabiner may be configured to be received entirely within the receptacle.

22 Claims, 10 Drawing Sheets

CARABINER HAVING REINFORCING SLEEVE

CROSS-REFERENCE TO RELATED APPLICATIONS

This application claims the benefit of U.S. Provisional Application Ser. No. 60/638,887 filed Dec. 21, 2004, the disclosure of which is incorporated in its entirety herein.

BACKGROUND OF THE INVENTION

1. Field of the Invention

The present invention relates to an improved carabiner. More particularly, the present invention relates to a locking carabiner having a sleeve configured to reinforce and strengthen the carabiner.

2. State of the Art

Carabiners are used for various applications in many different activities. Carabiners are typically associated with outdoor recreational activities, such as rock climbing, mountaineering, mountain rescue work, and sailing. However, carabiners are also employed in applications such as rescue work in urban and industrial settings, safety restraints in urban and industrial settings, law enforcement work, and military applications among many other applications.

Generally, a carabiner has a ring, or C-shaped body, having a gate which may be opened to insert a rope, sling, or a belay/rappel device (e.g., a figure eight device or another belay/rappel device). The gate is shut, typically, by a spring which urges the gate closed. Often times, the gate may be further secured in a closed position by a locking mechanism known as a sleeve, which locks the gate to prevent opening thereof.

Typically, a carabiner having an elongated shape, such as an oval or a D-shape, exhibits load carrying capacities which differ significantly, depending on the direction of the applied load. FIG. 1A shows a carabiner 100 having a generally C-shaped body 102 and a gate 104 pivotally secured thereto at a rivet area 110 of the C-shaped body 102. The gate 104 may be pivoted to an open position as shown in FIG. 1A. The carabiner 100 is depicted having a sleeve 112 that may be employed to lock the gate 104 when it is closed. The gate 104 engages with a nose region 114 of the C-shaped body 102 when in a closed position, shown in FIG. 1B and in cross-section in FIG. 2. The gate 104 includes a receptacle 116 for receiving the nose region 114, which may flare outward at the proximal end 120, to abut the gate 104 during loading of the carabiner 100. A carabiner having such a gate/nose interface may be referred to as a keylock carabiner. The load carrying capacity of the carabiner 100 is greatest along its major axis 106 and it exhibits a significantly reduced carrying capacity along its minor axis 108 (i.e., when cross-loaded).

Testing conducted on conventional carabiners has shown the point of failure during tensile loading along the major axis 106 to be located at the pivoting rivet area 110, the gate 104, or the nose region 114. FIG. 3 shows a conventional keylock carabiner 101 exhibiting failure at the nose region 114. The failure point is the narrowest portion 118 of the nose region 114, between the carabiner body 102 and the outward flaring proximal end 120 of the nose region 114. FIG. 4 depicts a conventional keylock carabiner 103 exhibiting another mode of failure. Flanges 122 on either side of the receptacle 116 of the gate 104 have been forced apart by the outward flaring proximal end 120 of the nose region 114 during tensile loading of the carabiner. Arrows on FIG. 4 depict the direction of deformity of the flanges 122. FIG. 5 depicts another view of the failed gate 104, with a longitudinal crack 124 through the gate 104, in the region behind the receptacle 116.

The thickness of the nose region 114 of the carabiner 100 may be increased, increasing the strength of the nose region 114, to avoid the mode of failure shown in FIG. 3. However, the receptacle 116 is a female recipient, sized and configured to mate with and engage the male nose region 114, and must likewise be increased in size. Increasing the size of the receptacle 116 requires the width of the flanges 122 to be decreased, or the overall diameter of the gate 104 must be increased. Decreasing the width of flanges 122 will cause a carabiner to be further susceptible to the mode of failure shown in FIGS. 4 and 5. Increasing the overall diameter of the gate 104 is undesirable because the size of the gate opening will be decreased. The thicker nose region or the increased gate diameter may prevent the carabiner from threading through an aperture of an external object, if the nose region or gate has a diameter larger than that of the aperture. This may be a disadvantage, preventing a user from attaching the carabiner to the external object, or prevent the carabiner from rotating to a desired position with respect to the external object. Another disadvantage of increasing the overall diameter of the gate is the additional material required, increasing the cost and the weight of the carabiner.

Accordingly, there is a need for a carabiner having increased strength during tensile loading.

BRIEF SUMMARY OF THE INVENTION

The present invention, in a number of embodiments, includes a carabiner having a reinforcing sleeve which may be engaged to increase the strength of the carabiner during loading. In addition, methods of making and using the carabiner of the present invention are also disclosed.

In an exemplary embodiment, a carabiner is disclosed. The carabiner may have a generally C-shaped body including a first end region, a second end region, and an elongated section therebetween. A gate is mounted at the second end region and is pivotable between a closed position and an open position. The carabiner further includes a sleeve mounted on the carabiner. The sleeve may be positioned to secure the gate in the closed position, with the first end region housed within a receptacle of a flanged region of the gate. The sleeve provides support for the flanged region of the gate in a plurality of lateral directions while securing the gate in the closed position.

The sleeve may be closely fitted with the gate along its longitudinal axis, with an inside diameter of the sleeve substantially similar to an outside diameter of the gate at the flanged region. The inside diameter of the sleeve may be substantially equal along the longitudinal length of the sleeve. The outside diameter of the gate may likewise be substantially equal along the longitudinal length of the gate. The gate and sleeve may be threaded, allowing the sleeve to be advanced between an unlocked position, enabling the gate of the carabiner to open, and a locked position, securing the gate in the closed position.

In a second exemplary embodiment of a carabiner according to the present invention, the carabiner includes a sleeve and a gate wherein the inside surface of the sleeve and the outside surface of the gate include cooperatively tapered portions. The inside diameter of the sleeve increases at the distal end of the sleeve. The outside diameter of the gate increases at the flanged region to fit the inside diameter of the sleeve. The tapered portions create clearance between the sleeve, in an unlocked or partially unlocked position, and the gate.

In a third exemplary embodiment of a carabiner according to the present invention, the carabiner includes a sleeve and a gate wherein the sleeve is configured to rotate about the gate. The sleeve includes a notch that may be positioned to allow ingress and egress to the receptacle of the gate for the nose of the carabiner. The sleeve provides support for the flanged region of the gate in a plurality of lateral directions.

In a fourth exemplary embodiment of a carabiner according to the present invention, the carabiner includes a sleeve and a gate wherein the sleeve is configured to slide longitudinally along the gate. The sleeve includes a projecting portion configured to house a projecting nose of the carabiner. The sleeve provides support for the flanged region of the gate in a plurality of lateral directions.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1A:
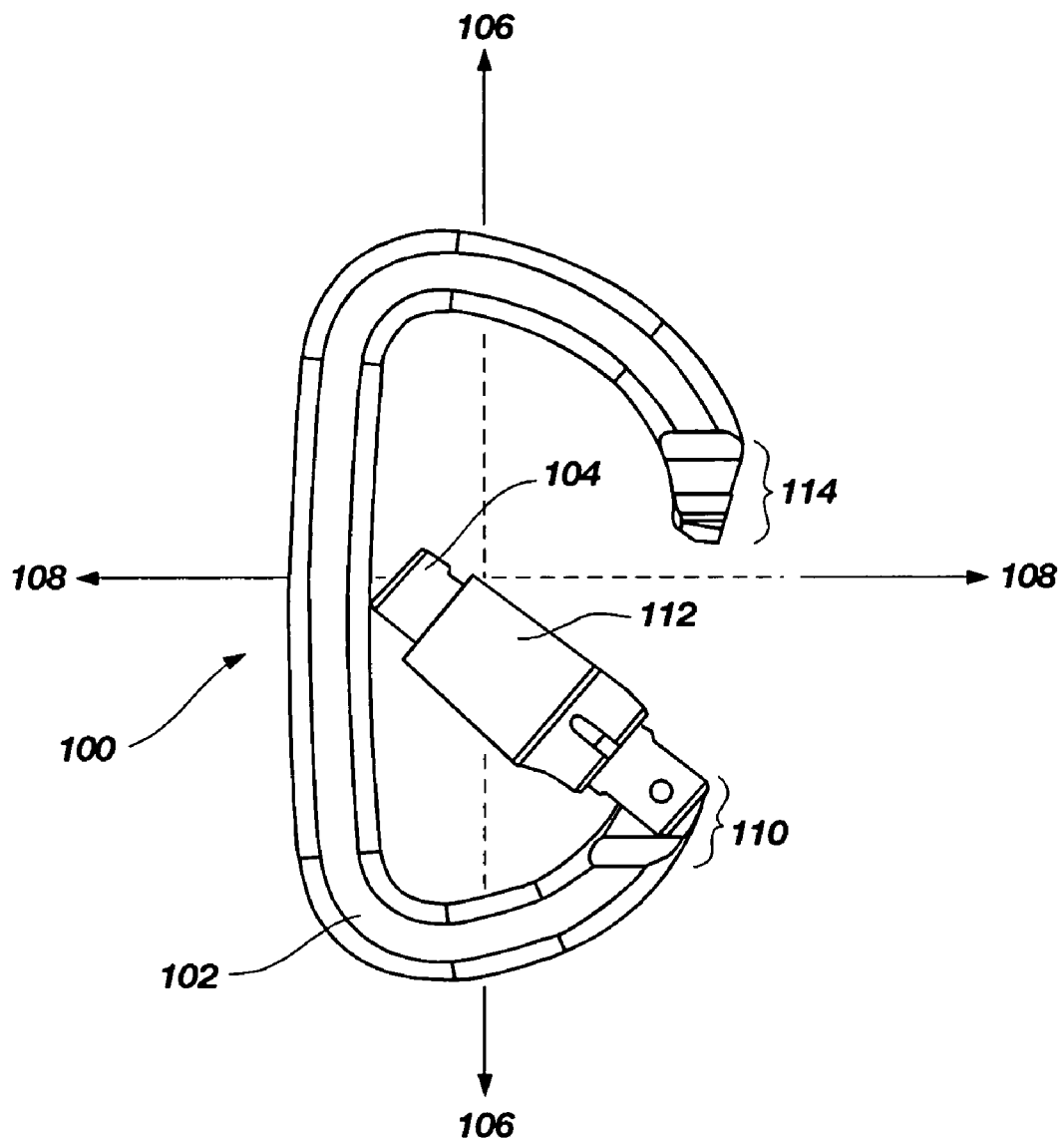
FIG. 1A illustrates a conventional locking carabiner in an open position.

The present invention, in a number of embodiments, includes carabiners having a reinforcing sleeve which may be engaged to increase the strength of the carabiner in a closed mode during loading. As known in the art, the body of the carabiners of the present invention may be formed from a variety of metals and alloys, such as aluminum alloys and steel. The body of the carabiners may be shaped by bending into the desired shape, followed by stamping or machining to impart a desired cross-section configuration, and heat treating, if necessary or desired, to increase the strength or alter other material properties thereof. The term "generally C-shaped," as used herein, encompasses any style of carabiner body, including, by way of example and not limitation, oval, D-shaped, offset D-shaped, pear shaped and twisted. In the detailed description which follows, like features and elements in the several embodiments are identified in the drawings with the same or similar reference numerals for the convenience of the reader.

Figure 6A:
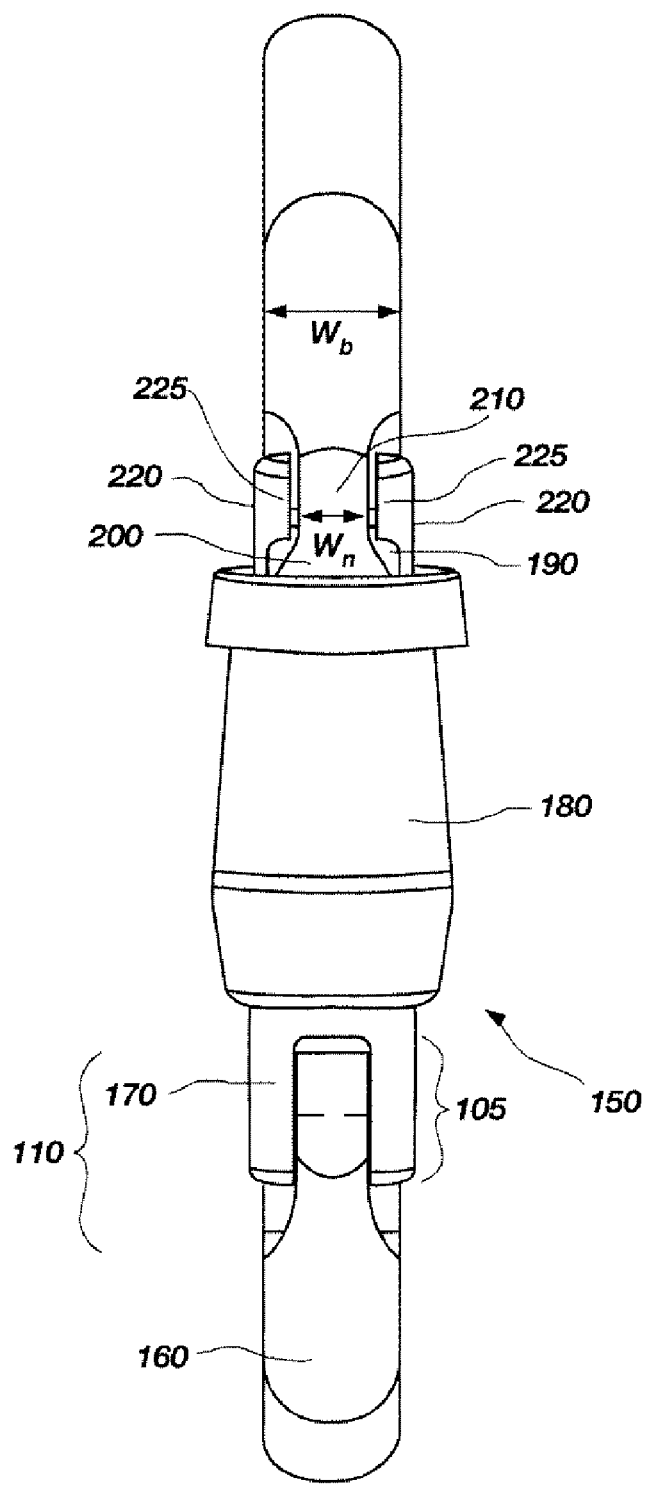
FIG. 6A illustrates an embodiment of a carabiner of the present invention.

An exemplary embodiment of the present invention is depicted in FIG. 6A. A carabiner 150 according to the present invention comprises a generally C-shaped body 160, and a gate 170 including a reinforcing sleeve 180. The gate 170 may be secured to the body 160 by a pin P (e.g., a rivet, screw, etc.) at the pivoting rivet area 110. The gate 170 may be rotatable about the pin P to enable the gate 170 to be opened and closed manually. The carabiner 150 depicted in FIG. 6A is a keylock carabiner; however, a carabiner having any suitable nose region, such as a conventional, notched nose region, also known as a pin and hook, is within the scope of the present invention. In the closed position depicted in FIG. 6A, a receptacle 190 in the gate 170 receives a nose 200 of the body 160. The receptacle 190 may be an opening through the gate 170 as shown, or the receptacle 190 may be a cavity within the gate 170, sized to receive the nose 200 of the carabiner 150. Flanges 220 of the gate 170 define the receptacle 190. The flanges 220 include opposing protruding regions 225 configured to be adjacent the narrowest portion 210 of the nose 200 when the gate 170 is in a closed position.

Figure 3:
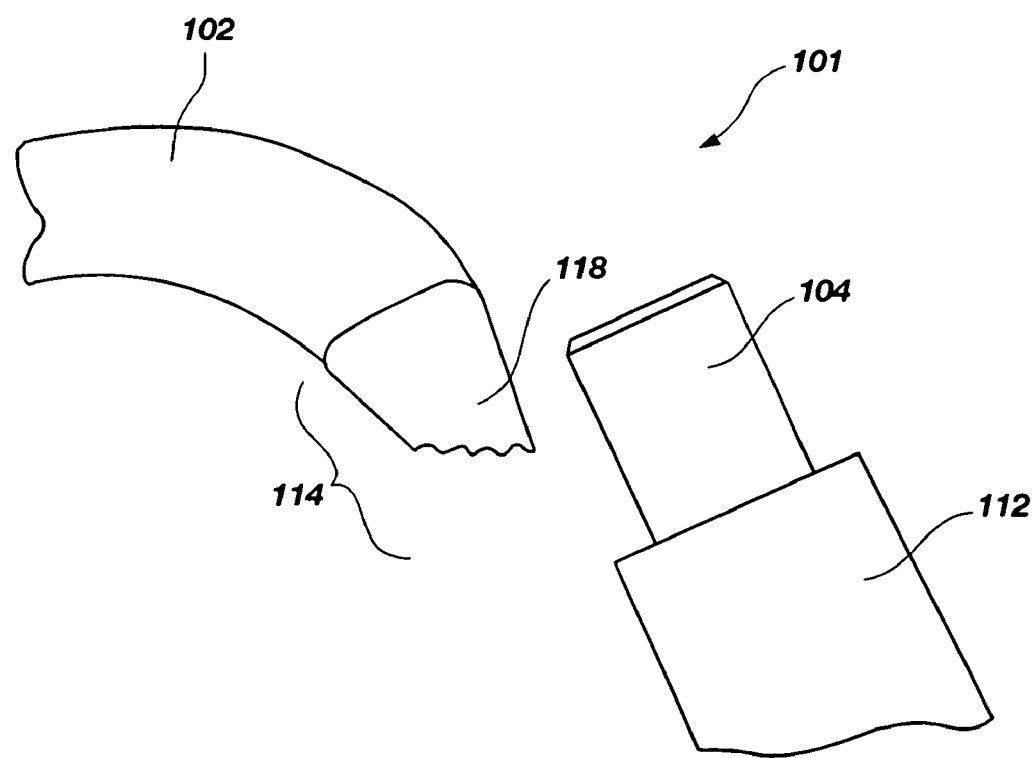
FIG. 3 illustrates a failed carabiner.

In one embodiment of a carabiner 150 of the present invention, the narrowest portion 210 of the nose 200 may be wider than the narrowest portion of the nose of a conventional carabiner. For example, the ratio of the width $W_n$ of the narrowest portion 210 of the nose 200 to the width $W_b$ of the body 160 of the carabiner 150 may be approximately 1:2.0 to 1:3.3, compared to the nose-to-body width ratio of a conventional locking carabiner of 1:3.4 to 1:5.0. The nose 200 is, therefore, more resistant to the mode of failure depicted in FIG. 3 than a conventional carabiner. The large range of body widths of conventional locking carabiners affects the range of the body width ratios. A conventional non-locking carabiner may have a low nose-to-body ratio, not because the nose is thicker, rather because the frame may be thinner.

The width of the gate may be substantially similar to the width of the body of the carabiner. A carabiner having a nose of a greater width may be received in a receptacle in the gate of a greater width. Specifically, the narrowest portion of the nose 200 is received within an entry portion 195 of the receptacle 190, between opposing protruding regions 225. The flanges 220 of the carabiner 150 of the present invention may be narrower than flanges of a conventional carabiner to create the receptacle 190 wider than a receptacle of a conventional carabiner. The width of the receptacle is shown as $W_r$ in FIG. 8A. The opposing protruding regions 225 may also be narrower than the protruding regions of flanges of a conventional carabiner to create the receptacle entry portion 195 wider than a receptacle entry portion of a conventional carabiner. The width of the receptacle entry portion 195 is shown as $W_{re}$ in FIG. 8A. The ratio of the width $W_{re}$ of the receptacle entry portion 195 to the width $W_g$ of the gate 170A may be approximately 1:1.5 to 1:2.6, compared to the receptacle entry portion to gate width ratio of a conventional carabiner of 1:2.73 to 1:3.90.

By way of example, one embodiment of the carabiner of FIG. 6A may have a body width $W_b$ of between about 0.42 and about 0.53 inch. A carabiner with this body size may have a gate, also with a width $W_g$ of between about 0.42 and about 0.53 inch. The width $W_n$ of the narrowest portion of the nose 200 may be between about 0.17 and about 0.21 inch. The width $W_{re}$ of the receptacle entry portion 195 may be between about 0.18 and about 0.22 inch.

By way of another example, another embodiment of the carabiner of FIG. 6A, the width $W_n$ of the narrowest portion 210 of the nose 200 may be 0.190 inch, and the width $W_b$ of the body 160 of the carabiner may be 0.472 inch. The width $W_{re}$ of the receptacle entry portion 195 may be 0.200 inch and the width $W_g$ of the gate 170 may be 0.472 inch. However, it will be understood by one of ordinary skill in the art that a larger carabiner may have a larger body width and thus a wider nose, receptacle and gate.

Figure 1B:
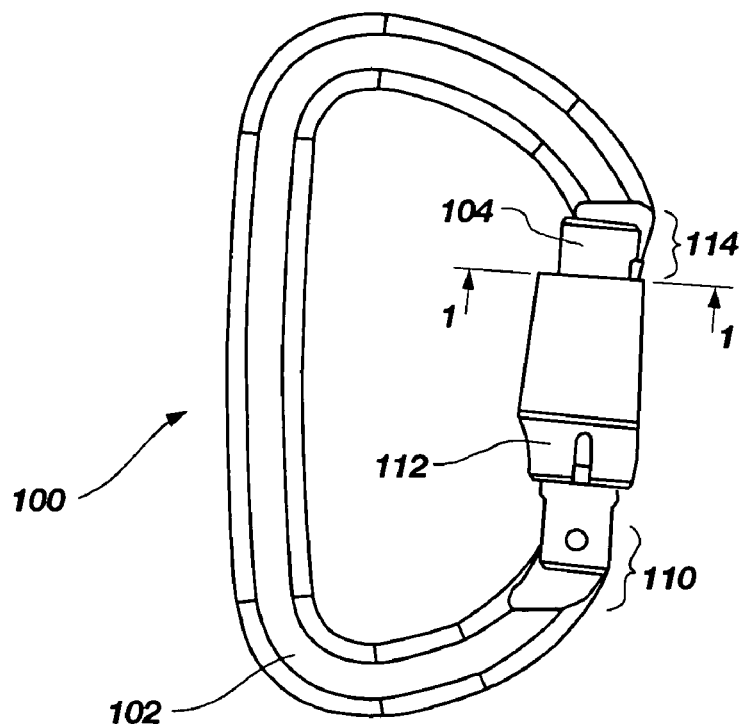
FIG. 1B illustrates the conventional locking carabiner of FIG. 1A in a closed position.
Figure 1C:
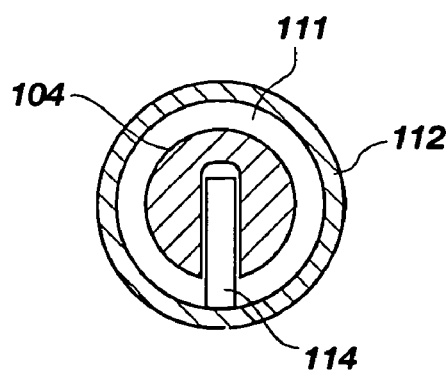
FIG. 1C illustrates a top view of a portion of the conventional locking carabiner of FIG. 1B, taken at line 1-1.
Figure 2:
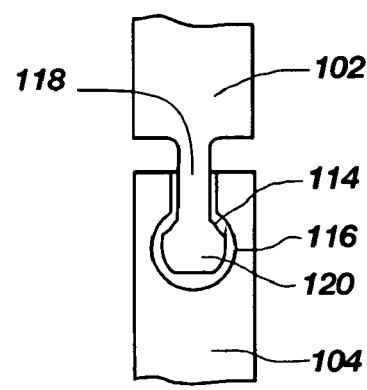
FIG. 2 illustrates a side view of another portion of the carabiner of FIGS. 1A-1B.
Figure 6B:
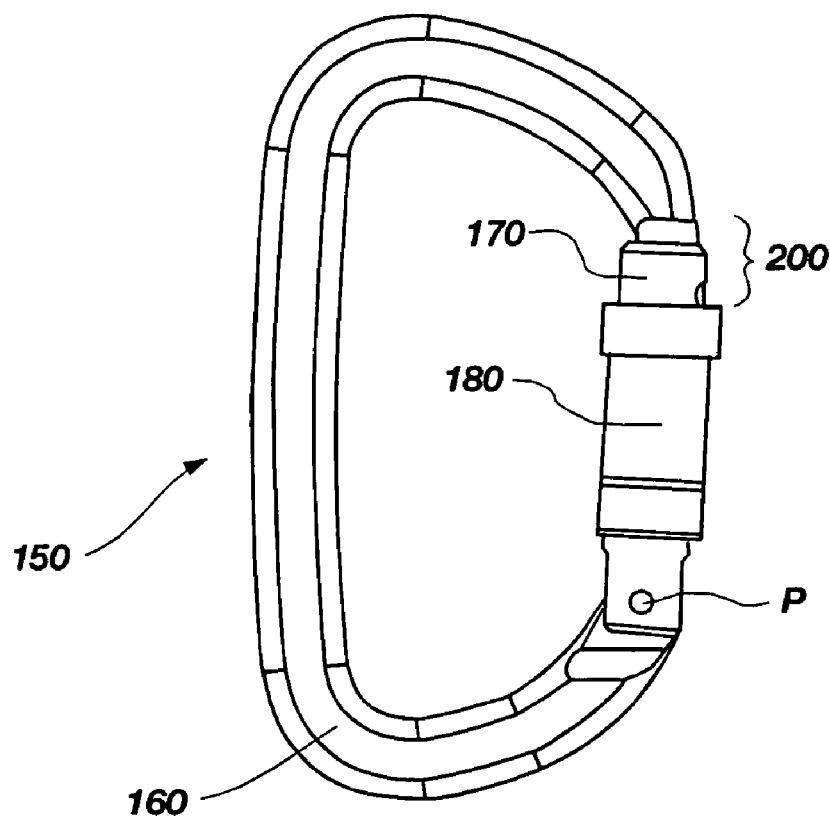
FIG. 6B illustrates another view of the carabiner of FIG. 6A.

FIG. 6B shows another view of the carabiner 150. When in the closed position, the nose 200 fits entirely within the gate 170 of the carabiner 150. In other words, the nose 200 is completely enclosed in the receptacle 190 of the gate 170. Referring back to FIG. 1B, the nose region 114 of a conventional carabiner 100 will protrude from the gate 104 when in a closed position. A sleeve 112 of a conventional locking carabiner 100 cannot be closely fitted about the gate 104 because a closely fitted sleeve could not rotate about the protruding nose region 114. As seen in FIG. 1C, the sleeve 112 of a conventional carabiner engages only the protruding nose region 114, preventing the carabiner 100 from opening, but does not engage the gate 104 in the region about the receptacle. There is a gap 111 between the inner circumference of the annular sleeve 112 and the outer circumference of the gate 104 because the diameter of the gate 104 is much less than the inside diameter of the annular sleeve 112. The nose 200 of the carabiner 150 of the present invention, enclosed within the gate 170, enables the reinforcing sleeve 180 of the present invention to be closely fitted yet rotate unimpeded.

Figure 7:
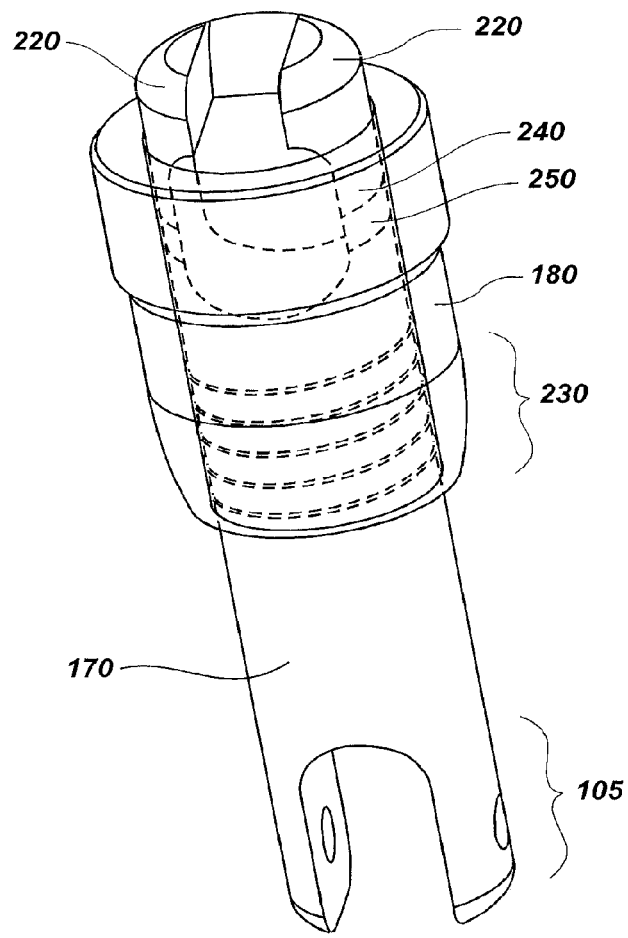
FIG. 7 illustrates a first embodiment of the gate and sleeve of the carabiner of FIG. 6A.

One exemplary configuration for the gate 170 and the reinforcing sleeve 180 is illustrated in FIG. 7, where the gate 170 is shown for clarity without the body 160 of the carabiner 150. The reinforcing sleeve 180 may be formed from a material such as, for example, a machined aluminum alloy, a plastic (e.g., injection molded nylon), or a composite (e.g., injection molded fiber reinforced plastic). A threaded portion 230 of the reinforcing sleeve 180 may be configured to engage with a circumferential ridge (not shown) about the gate 170. Alternatively, the outside surface 250 of the gate 170 may also be threaded to engage with the threads of the reinforcing sleeve 180. The threads enable the reinforcing sleeve 180 to be screwed closed, or advanced, to a locked position as shown, covering at least a portion of the receptacle 190 of the gate 170. The reinforcing sleeve 180 may be screwed open, or backed off, to an unlocked position, shifting the reinforcing sleeve 180 longitudinally along the gate 170 toward a pivoting rivet end 105 of the gate 170, uncovering the receptacle 190. Optionally, the reinforcing sleeve 180 may be longitudinally slidable along the gate 170, between a locked and unlocked position. An inside surface 240 of the reinforcing sleeve 180 is flush with an outside surface 250 of the gate 170 along the length of the gate 170. The reinforcing sleeve 180 provides lateral structural support for the flanges 220 under a load applied along the major axis of the carabiner 150, preventing the flanges 220 from being forced apart by the nose 200 during tensile loading of the carabiner 150.

Figure 8A:
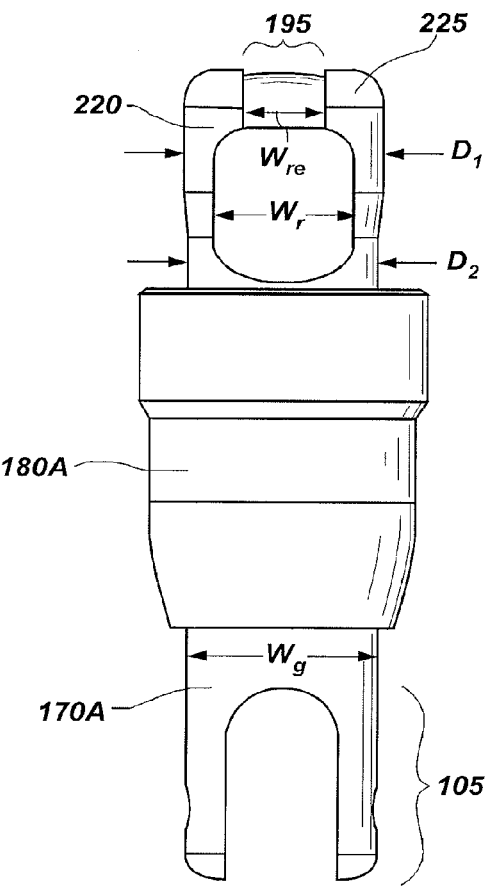
FIGS. 8A-8C illustrate a second embodiment of the gate and sleeve of the carabiner of FIG. 6A.
Figure 8B:
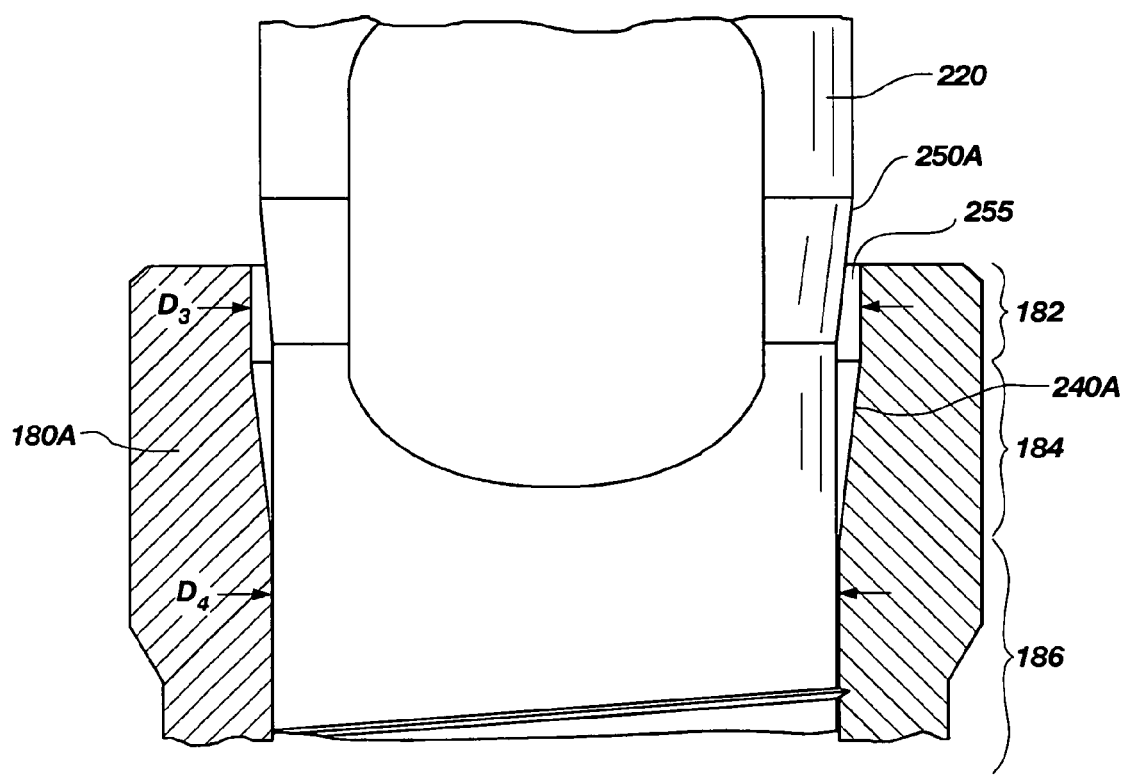
Figure 8C:
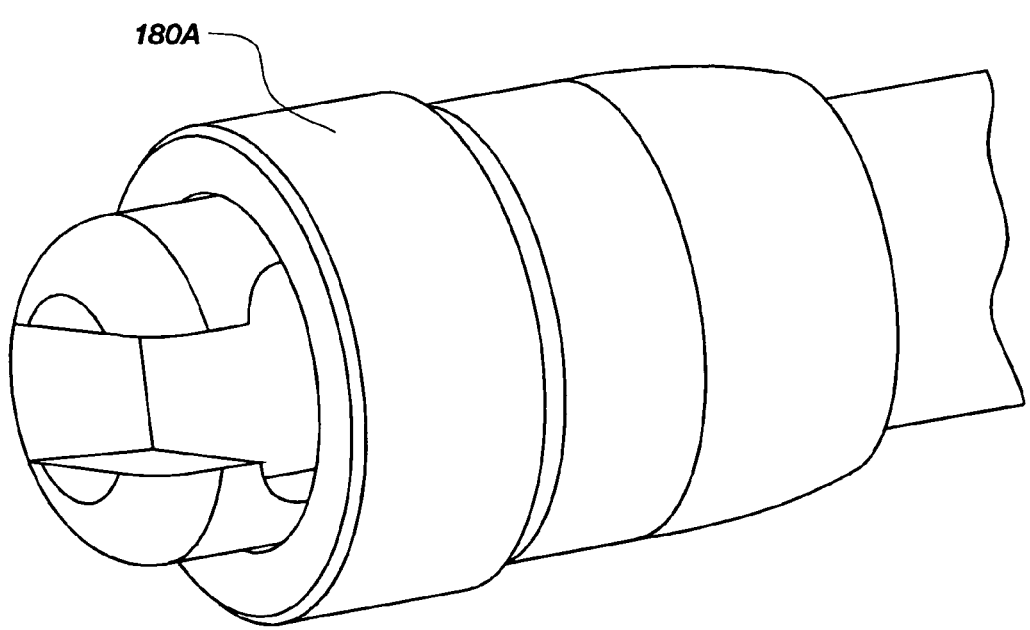

In a second exemplary embodiment of the present invention, illustrated in FIGS. 8A-8C, the reinforcing sleeve 180A and the gate 170A are mutually configured to provide a tapered engagement. FIG. 8A shows the reinforcing sleeve 180A in an unlocked position. The outer surface 250A of the gate 170A is tapered outward toward the flanges 220. Therefore, the diameter $D_1$ of the gate 170A at the flanges 220 is greater than the diameter $D_2$ of the central portion of the gate 170A. FIG. 8B depicts the reinforcing sleeve 180A partially locked. An inner surface 240A of the reinforcing sleeve 180A is configured with a taper, and an inside diameter $D_3$ of a distal portion 182 of the reinforcing sleeve 180A is greater than an inside diameter $D_4$ of a central portion 186 of the reinforcing sleeve 180A. The gradient of the inner surface 240A of the tapered portion 184 matches the gradient of the outer surface 250A of the gate 170A at the tapered portion 184.

As shown in FIG. 8B, in the partially locked position, there may be clearance 255 between the outer surface 250A of the gate 170A and the inner surface 240A of the reinforcing sleeve 180A at the distal portion 182 and the tapered portion 184. The clearance 255 may be present in the unlocked position as well. In the fully locked position, as shown in FIG. 8C, the reinforcing sleeve 180A is closely fitted to the gate 170A along its length. The clearance 255 created by the tapered surfaces of the gate 170A and the reinforcing sleeve 180A may prevent dirt or ice from jamming the reinforcing sleeve 180A. A user might be unable to lock and unlock the carabiner 150 when it is jammed.

Figure 9A:
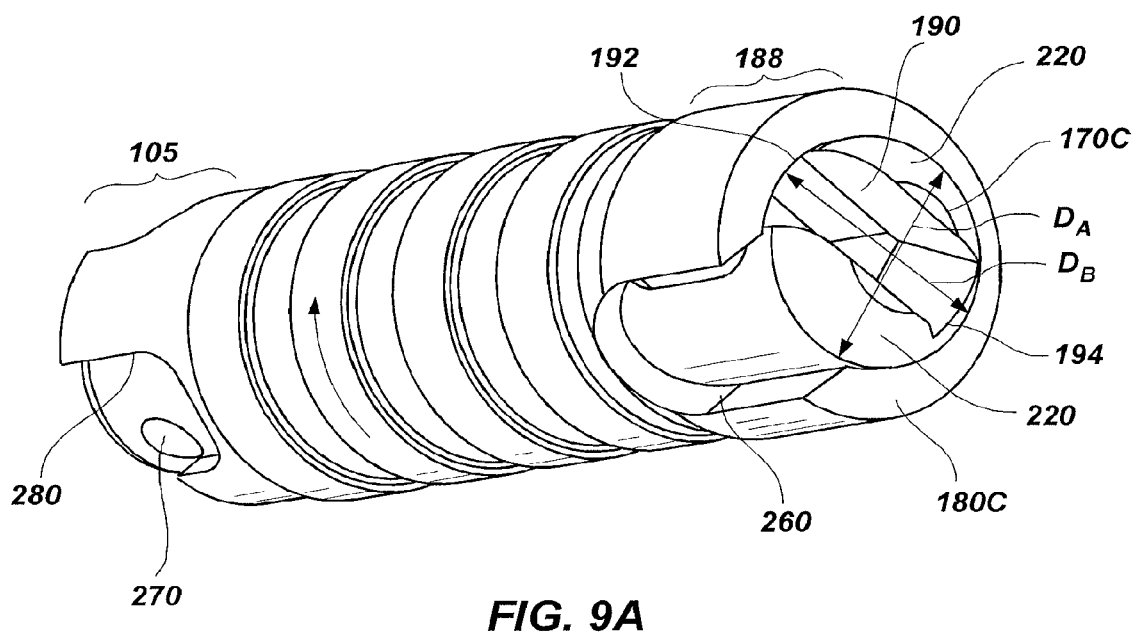
FIG. 9A illustrates a third embodiment of the gate and sleeve of the carabiner of FIG. 6A.

In a third exemplary embodiment of the present invention, illustrated in FIG. 9A, the reinforcing sleeve 180C is rotatable about the gate 170C. The reinforcing sleeve 180C is depicted in the locked position. The reinforcing sleeve 180C may be twisted in the direction of the arrow to an unlocked position. In the unlocked position, a notch 260 of the reinforcing sleeve 180C is situated adjacent the receptacle 190 of the gate 170C. With the reinforcing sleeve 180C in the unlocked position, the gate 170C may swing inward to an open position, releasing the nose 200 of the carabiner 150. Referring back to FIG. 1A, a carabiner in an open position is shown, with the nose 114 released from the receptacle 116 of the gate 104. Returning to FIG. 9A, an aperture 270 for housing the pin P (shown in FIG. 6B) is positioned at the pivoting rivet end 105 of the gate 170C. A portion of the pin P may protrude slightly from the surface of the gate 170C. A retaining notch 280 of the reinforcing sleeve 180C is configured for engagement with the protruding portion of the pin P, preventing the reinforcing sleeve 180C from rotating to the unlocked position unless disengaged by a user. The reinforcing sleeve 180C may be disengaged by sliding the reinforcing sleeve 180C longitudinally away from the pin P, enabling the reinforcing sleeve 180C to rotate without interference with the protruding portion of the pin P.

Figure 4:
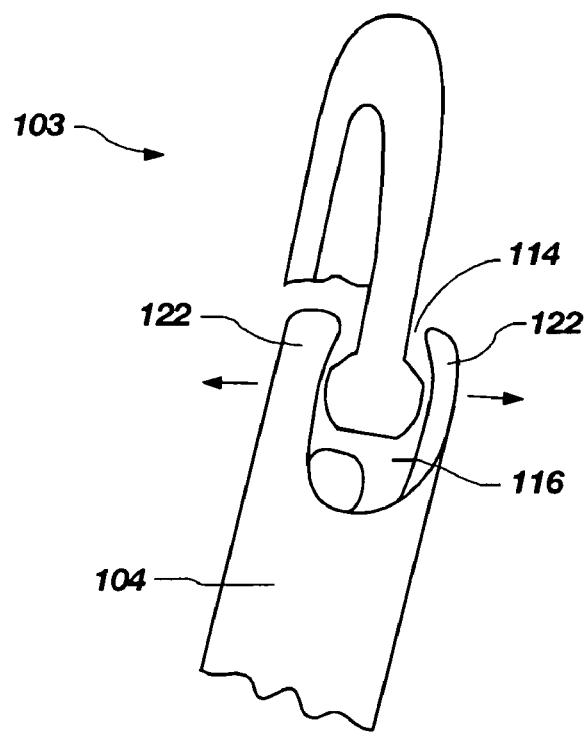
FIG. 4 illustrates another failed carabiner.
Figure 5:
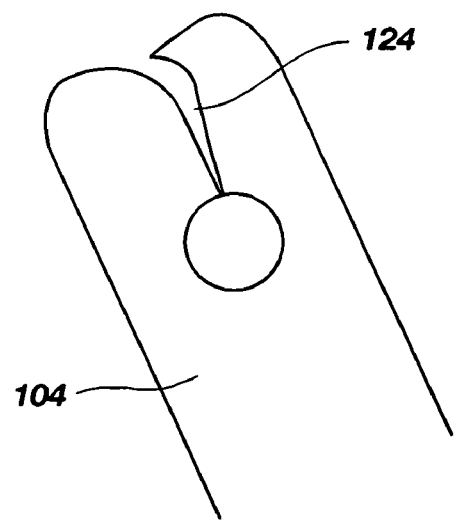
FIG. 5 illustrates another view of the failed carabiner of FIG. 4.

A distal portion 188 of the reinforcing sleeve 180C provides support in lateral directions for the flanges 220 of the gate 170C, preventing the flanges 220 from being forced apart by the nose 200 during tensile loading of the carabiner 150 along its major axis. The reinforcing sleeve 180C thus prevents the mode of carabiner failure depicted in FIGS. 4 and 5. Although the fourth embodiment of the present invention includes the notch 260 in the reinforcing sleeve 180C, the distal portion 188 of the reinforcing sleeve 180C extends circumferentially sufficiently far around the gate 170C to provide lateral support. Optionally, grooves may be provided on the outside surface of the reinforcing sleeve 180C, enabling a user to firmly grasp the reinforcing sleeve 180C for rotation thereof.

Figure 9B:
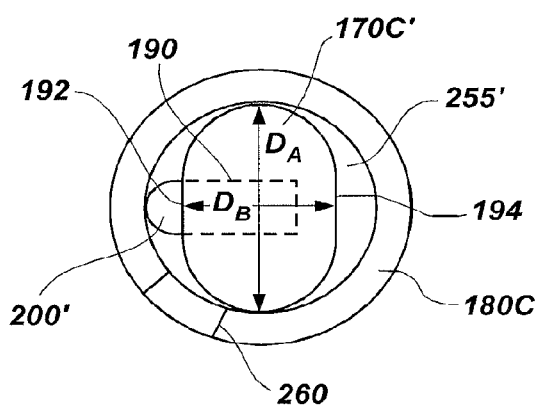
FIG. 9B illustrates a cross-section of another embodiment of a gate and sleeve of a carabiner of the present invention.

Turning to FIG. 9B, a reinforcing sleeve 180C rotatable about a gate 170C' and having clearance 255' between the gate 170C' and the reinforcing sleeve 180C is within the scope of the present invention. The gate 170C' may have a non-circular cross-section. For example, the cross-section may be substantially elliptical, as shown in FIG. 9B. The diameter $D_A$ of the gate 170C crossing from flange 220 to flange 220 may be a major diameter of the ellipse, greater than the minor diameter, that is, diameter $D_B$ in the orthogonal direction, crossing from an opening 192 of the receptacle 190 to a back side 194 of the gate 170C. The inside diameter of reinforcing sleeve 180C may be substantially equal to the greater diameter $D_A$, enabling the reinforcing sleeve 180C to provide lateral support for the flanges 220 when retaining the nose 200 within the receptacle 190, locking the carabiner 150 in a closed position. A rotating reinforcing sleeve 180C and gate 170C' having clearance 255' may be useful in a carabiner wherein, in a closed position, the nose 200' protrudes from the receptacle 190. Referring back to FIG. 1B, a side view of a conventional carabiner 100 having a protruding nose region 114 is depicted. As seen in the cross-sectional view of FIG. 1C, the sleeve 112 provides no lateral support for the gate 104 because of the gap 111 therebetween.

Figure 10:
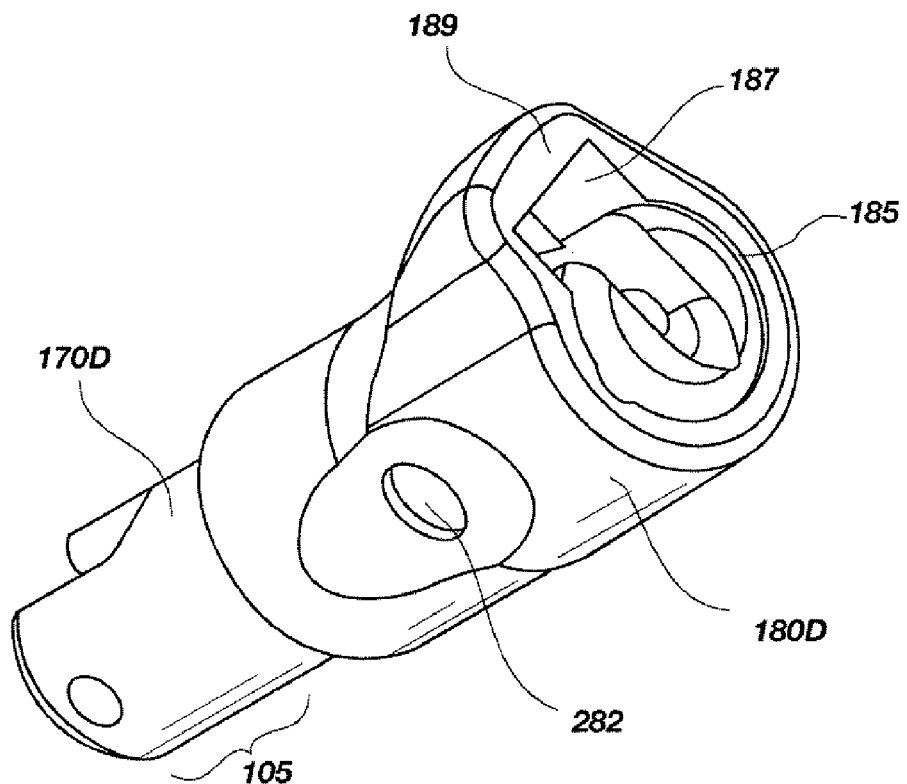
FIG. 10 illustrates a fourth embodiment of the gate and sleeve of the carabiner of FIG. 6A.

In a fourth exemplary embodiment of the present invention, illustrated in FIG. 10, a reinforcing sleeve 180D is configured for use with a carabiner having a protruding nose. Referring back to FIG. 1C, a cross-sectional view of a closed carabiner 100 having a gate 104 and a nose region 114 which protrudes therefrom with the carabiner 100 in the closed position is shown. Returning to FIG. 10, the reinforcing sleeve 180D may be of a generally annular shape, with a projecting portion 189 on one end thereof. The projecting portion 189 may extend in a single radial direction and have an interior configured to receive a protruding nose. The interior of the projecting portion 189 may comprise a notch 187 in open communication with the interior region 185 of the annular reinforcing sleeve 180D. The reinforcing sleeve 180D is mounted to move longitudinally along the gate 170D between an open and a closed position. The reinforcing sleeve 180D does not necessarily require a rotational force to be applied by the user to adjust the reinforcing sleeve 180D between the open and the closed position, and may be longitudinally resiliently biased toward the closed position. The reinforcing sleeve 180D is closely fitted to the gate 170D, providing support in lateral directions. The interior region 185 of the annular reinforcing sleeve 180D surrounds the gate 170D, and the protruding nose (not shown) of the closed carabiner may be housed within the notch 187.

Retaining aperture 282 is configured to receive a resiliently biased element (not shown) disposed on gate 170D to retain the reinforcing sleeve 180D in a locked or unlocked position. The resiliently biased element may protrude from the outer surface of the gate 170D, and engage with the retaining aperture 282, preventing longitudinal movement of the reinforcing sleeve 180D unless depressed by a user.

The carabiner 150 of the present invention may have an increased strength of about 5-20% when under tensile load applied along the major axis. An exemplary required minimum strength for a carabiner is 22 kN, and the carabiner having a reinforcing sleeve according to the present invention may have a 1.5 kN increase in strength over a conventional carabiner. When a carabiner is loaded along the minor axis, with an outward force on the gate, a carabiner having a reinforcing sleeve according to the present invention may also exhibit significantly increased strength. A carabiner may additionally be subject to inward force along the minor axis when in use. For example, a rappel device may lever against the gate of the carabiner, breaking the sleeve and allowing the gate to open. The carabiner having a reinforcing sleeve according to the present invention may include increased sleeve material compared to a conventional locking carabiner. Thus the sleeve and gate area of a carabiner of the present invention may be stronger and more robust, resisting failure under an inward force.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. For example, a carabiner having a frame including a receptacle and a gate including a nose is within the scope of the present invention. That is, the frame may include a female structure configured to receive a male section of the gate. A reinforcing sleeve may be closely fitted around the receptacle portion of the frame, preventing the receptacle portion of the frame from splitting open. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

What is claimed is:

1. A carabiner comprising:
   a generally C-shaped body having a first end region, a second end region, and an elongated section therebetween;
   an elongated gate mounted proximate one end thereof at the second end region and being pivotable between a closed position engaged with the first end region and an open position, the gate including at least two flanges defining a receptacle therebetween, the receptacle configured to receive therein at least a portion of the first end region of the generally C-shaped body; and
   a sleeve movably mounted on the gate between a gate unlocked position permitting opening of the gate and a gate locked position precluding opening of the gate, wherein the sleeve in the gate locked position is closely fitted about the gate and abuts against the at least two flanges of the gate at least upon lateral deformation of the at least two flanges, the sleeve reinforcing the at least two flanges against plastic deformation upon tensile loading of the carabiner when the gate is in the closed position and the sleeve is in the gate locked position.

2. The carabiner of claim 1, wherein the sleeve at least substantially prevents plastic deformation of the at least two flanges upon tensile loading of the carabiner when the gate is in the closed position and the sleeve is in the gate locked position.

3. The carabiner of claim 1, wherein the at least a portion of the first end region does not protrude radially from the receptacle of the gate when the gate is in the closed position.

4. The carabiner of claim 1, wherein the sleeve is threaded to be rotatable about the gate between the gate unlocked position and the gate locked position.

5. The carabiner of claim 1, wherein the sleeve is slidable in a longitudinal direction along the gate between the gate unlocked position and the gate locked position.

6. The carabiner of claim 5, wherein the sleeve includes a projecting portion disposed adjacent the first end region of the C-shaped body when the gate is in the closed position.

7. The carabiner of claim 1, wherein the sleeve is rotatable about the gate between the gate unlocked position and the gate locked position, while the sleeve remains in a consistent longitudinal position along the gate.

8. The carabiner of claim 1, wherein the sleeve includes a tapered inner surface and the gate includes a cooperatively tapered outer surface to provide clearance between the inner surface of the sleeve and the outer surface of the gate with the sleeve in the gate unlocked position.

9. The carabiner of claim 1, wherein the gate includes a portion having a substantially elliptical cross-section.

10. The carabiner of claim 1, wherein the at least a portion of the first end region comprises a nose having a constricted portion and lateral protrusions on the distal end thereof, a ratio of a width of the constricted portion to a width of the elongated section of the C-shaped body being between about 1:2.0 and about 1:3.0.

11. The carabiner of claim 1, wherein the receptacle has a constricted portion at a distal end of the gate, and wherein a ratio of a width of the constricted portion of the receptacle to a width of the gate is between about 1:1.5 and about 1:2.6.

12. A carabiner comprising:
a generally C-shaped body having a first end region, a second end region, and an elongated section therebetween;
an elongated gate including at least a portion having a substantially elliptical cross-section mounted proximate one end thereof at the second end region and being pivotable between a closed position engaged with the first end region and an open position; and
a sleeve movably mounted on the gate between a gate unlocked position permitting opening of the gate and a gate locked position precluding opening of the gate, wherein the sleeve in the gate locked position contacts the elongated gate at each end of a major diameter thereof proximate the first end region of the generally C-shaped body, and contacts a portion of the first end region of the generally C-shaped body.

13. The carabiner of claim 12, wherein the gate includes a female structure configured to receive a male section of the first end region and the sleeve at least partially surrounds the structure and the male section when the gate is in the closed position.

14. The carabiner of claim 13, wherein a portion of the male section of the first end region protrudes radially from the female structure of the gate when the gate is in the closed position, and the sleeve contacts the protruding portion of the male section.

15. The carabiner of claim 12, wherein the sleeve is threaded to be rotatable about the gate between the gate unlocked position and the gate locked position.

16. A method of forming a carabiner, comprising:
providing a generally C-shaped body having a first end region, a second end region, and an elongated section therebetween;
forming a male section on the first end region of the generally C-shaped body;
forming at least two flanges on an elongated gate to define a receptacle therebetween;
pivotally mounting the elongated gate to the second end region, the elongated gate being pivotable between a closed position engaged with the first end region and an open position;
mounting a sleeve to the elongated gate, the sleeve being movable relative to the elongated gate between a gate unlocked position permitting opening of the elongated gate and a gate locked position precluding opening of the elongated gate;
forming the sleeve to be closely fitted about the elongated gate in the gate locked position; and
forming the sleeve to have a size and shape causing the sleeve to abut against the at least two flanges of the elongated gate at least upon lateral deformation of the at least two flanges and to prevent the at least two flanges from being forced apart upon tensile loading of the carabiner when the elongated gate is in the closed position and the sleeve is in the gate locked position.

17. The method of claim 16, further comprising forming the sleeve to be rotatable relative to the elongated gate between the gate unlocked position and the gate locked position.

18. The method of claim 16, further comprising forming the sleeve to be slidable longitudinally relative to the elongated gate between the gate unlocked position and the gate locked position.

19. The method of claim 18, further comprising housing a portion of the first end region which protrudes from the elongated gate in the closed position within a projecting portion of the sleeve.

20. The method of claim 16, further comprising forming the elongated gate to comprise an outside surface having a tapered region, and forming the sleeve to comprise an inside surface having a tapered region configured to engage the tapered region of the outside surface of the gate when the sleeve is in the elongated gate locked position.

21. The method of claim 16, further comprising forming the male section to be at least substantially entirely received within the receptacle of the elongated gate when the elongated gate is in the closed position.

22. A carabiner comprising:
a generally C-shaped body having a first end region, a second end region, and an elongated section therebetween;
an elongated gate mounted proximate one end thereof at the second end region and being pivotable between a closed position and an open position, an end portion of the gate including a female structure configured to receive a male section of the first end region at least substantially entirely within the female structure when the gate is in the closed position; and
a sleeve movably mounted on the gate between an unlocked position permitting opening of the gate and a locked position precluding opening of the gate, the sleeve abutting against an exterior surface of the end portion of the gate at least upon lateral deformation of the end portion of the gate, the sleeve reinforcing the end portion of the gate against plastic deformation upon tensile loading of the carabiner when the gate is in the closed position and the sleeve is in the locked position.

* * * * *

UNITED STATES PATENT AND TRADEMARK OFFICE
CERTIFICATE OF CORRECTION

| | | |
|---|---|---|
| PATENT NO. | : 7,540,074 B2 | Page 1 of 1 |
| APPLICATION NO. | : 11/291493 | |
| DATED | : June 2, 2009 | |
| INVENTOR(S) | : Rocke P. Thompson | |

It is certified that error appears in the above-identified patent and that said Letters Patent is hereby corrected as shown below:

On the title page:
In ITEM (74) *Attorney, Agent or Firm*      change "Traskbritt" to --TraskBritt--

Signed and Sealed this
Twenty-second Day of March, 2011

David J. Kappos
*Director of the United States Patent and Trademark Office*